United States Patent
Ge (10) Patent No.: US 8,561,157 B2
(45) Date of Patent: Oct. 15, 2013

(54) METHOD, SYSTEM, AND COMPUTER-READABLE STORAGE MEDIUM FOR ESTABLISHING A LOGIN SESSION

(75) Inventor: Jiuyuan Ge, Centereach, NY (US)

(73) Assignee: Canon U.S.A., Inc., Melville, NY (US)

( * ) Notice: Subject to any disclaimer, the term of this patent is extended or adjusted under 35 U.S.C. 154(b) by 95 days.

(21) Appl. No.: 13/242,361

(22) Filed: Sep. 23, 2011

(65) Prior Publication Data

US 2013/0081118 A1    Mar. 28, 2013

(51) Int. Cl.
*G06F 21/00*    (2013.01)

(52) U.S. Cl.
USPC .......................................................... 726/6

(58) Field of Classification Search
USPC .......................................................... 726/6
See application file for complete search history.

(56) References Cited

U.S. PATENT DOCUMENTS

| | | | |
|---|---|---|---|
| 6,018,805 A * | 1/2000 | Ma et al. | 714/4.3 |
| 6,651,168 B1 | 11/2003 | Kao et al. | |
| 6,763,468 B2 | 7/2004 | Gupta et al. | |
| 6,826,696 B1 | 11/2004 | Chawla et al. | |
| 6,892,307 B1 | 5/2005 | Wood et al. | |
| 7,254,831 B2 | 8/2007 | Saunders et al. | |
| 7,392,536 B2 | 6/2008 | Jamieson et al. | |
| 7,520,339 B2 | 4/2009 | Ikenoya | |
| 7,716,461 B2 | 5/2010 | Downer et al. | |
| 7,779,248 B2 | 8/2010 | Parham et al. | |
| 7,793,342 B1 | 9/2010 | Ebrahini et al. | |
| 2001/0037469 A1 * | 11/2001 | Gupta et al. | 713/202 |
| 2005/0235150 A1 | 10/2005 | Kaler et al. | |
| 2006/0021019 A1 | 1/2006 | Hinton et al. | |
| 2007/0005773 A1 | 1/2007 | Apreutesei et al. | |
| 2009/0260066 A1 | 10/2009 | Miller et al. | |
| 2010/0077467 A1 | 3/2010 | Satagopan et al. | |
| 2010/0297983 A1 * | 11/2010 | Aarni et al. | 455/411 |
| 2011/0055382 A1 | 3/2011 | Narasimhan | |

* cited by examiner

*Primary Examiner* — Jason Gee
(74) *Attorney, Agent, or Firm* — Canon U.S.A., Inc. IP Division

(57) ABSTRACT

A method, system, and computer-readable storage medium are provided. Embodiments of the invention include receiving notification of a log-in event associated with a first login session wherein a user is authorized to access a resource of a computing system based on a credential. During the first login session and in response to determining the credential is valid, a second login session is established by granting the user access to a resource of an application associated with the computing system. During the first login session and in response to receiving information indicating an event has occurred, the second login session is terminated such that the user does not have access to the resource of the application. And during the first login session and in response to determining again that the credential is valid, a third login session is established by granting the user access to a resource of the application.

19 Claims, 6 Drawing Sheets

METHOD, SYSTEM, AND COMPUTER-READABLE STORAGE MEDIUM FOR ESTABLISHING A LOGIN SESSION

BACKGROUND OF THE INVENTION

1. Field of the Invention

The present invention relates generally to authentication, and more particularly to a method, system, and computer-readable storage medium for establishing a login session.

2. Description of the Related Art

Modern computing systems often employ security measures to prevent breaches of the computing system. For example, computing systems may require users to be authenticated before granting them access to one or more resources of the computing system. Authentication may include the computing system prompting the user to provide a credential in order to log in to the computing system. The authentication may be based on a username and password, a smart card and personal identification number (PIN), or other information associated with the user. Once logged in to the computing system, the user has access to one or more resources of the computing system.

However, while secure authentication mechanisms can reduce the risk of unauthorized access to protected resources, those authentication mechanisms may become barriers hindering authorized users from accessing protected resources. Users may desire the ability to change from interacting with one application to another application without regard to authentication barriers that protect each particular system supporting those applications. In order to reduce such burdens on authorized users while maintaining system security, some computing systems have implemented single sign-on mechanisms.

In systems with single sign-on capability, a user provides a credential once and gains access to multiple computing systems without providing their credential again, even though each computing system requires the user to be authenticated. For example, a user may provide a credential only once and gain access both to resources of a computing device and to resources of an application associated with the computing device even though both the computing device and the application independently require the user to be authenticated before granting the user access to resources of the respective systems.

In the above example, a user provides the credential once and is logged in to the computing device and the application. In some scenarios, an event may cause the login session to end for the application but not cause the login session to end for the computing device. That is, the user remains logged in to the computing device but is logged out of the application associated with the computing device.

In conventional systems, once logged out of the application, the user needs to again provide a credential in order to log back in to the application. For example, the application may prompt the user to provide a credential when the user tries to access the application, even though the user remains logged in to the computing device.

In some cases, the user may need to manually log out of the computing device and log back in to the computing device and application in the same manner the user initially logged in. For example, in a case that the login session on the computing device is maintained by a smart card remaining in a smart card reader, the user cannot log back in to the application unless the user first logs out of the computing device (by removing the smart card from the smart card reader) and then logs back in to the computing device and application by re-inserting the smart card in the smart card reader.

These interruptions and repetitive communications can diminish the efficiency and quality of the user's interaction with such conventional systems.

SUMMARY OF THE INVENTION

Embodiments of the present invention address the various problems described above. Methods, apparatuses, and computer-readable storage media for establishing a login session are disclosed.

Embodiments of the invention include receiving notification of a log-in event associated with a first login session wherein a user is authorized to access a resource of a computing system based on a credential. Moreover, the credential is obtained, stored in a memory, and it is determined whether the credential is valid. During the first login session and in response to determining that the credential is valid, a second login session is established by granting the user access to a resource of an application associated with the computing system. Furthermore, information is received indicating an event has occurred. During the first login session and in response to the receiving the information indicating the event has occurred, the second login session is terminated such that the user does not have access to the resource of the application. In response to the terminating the second login session, the credential is retrieved from the memory. In response to the retrieving the credential from the memory, it is determined again whether the credential is valid. And during the first login session and in response to determining again that the credential is valid, a third login session is established by granting the user access to a resource of the application.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described with reference to the drawings.

Figure 1:
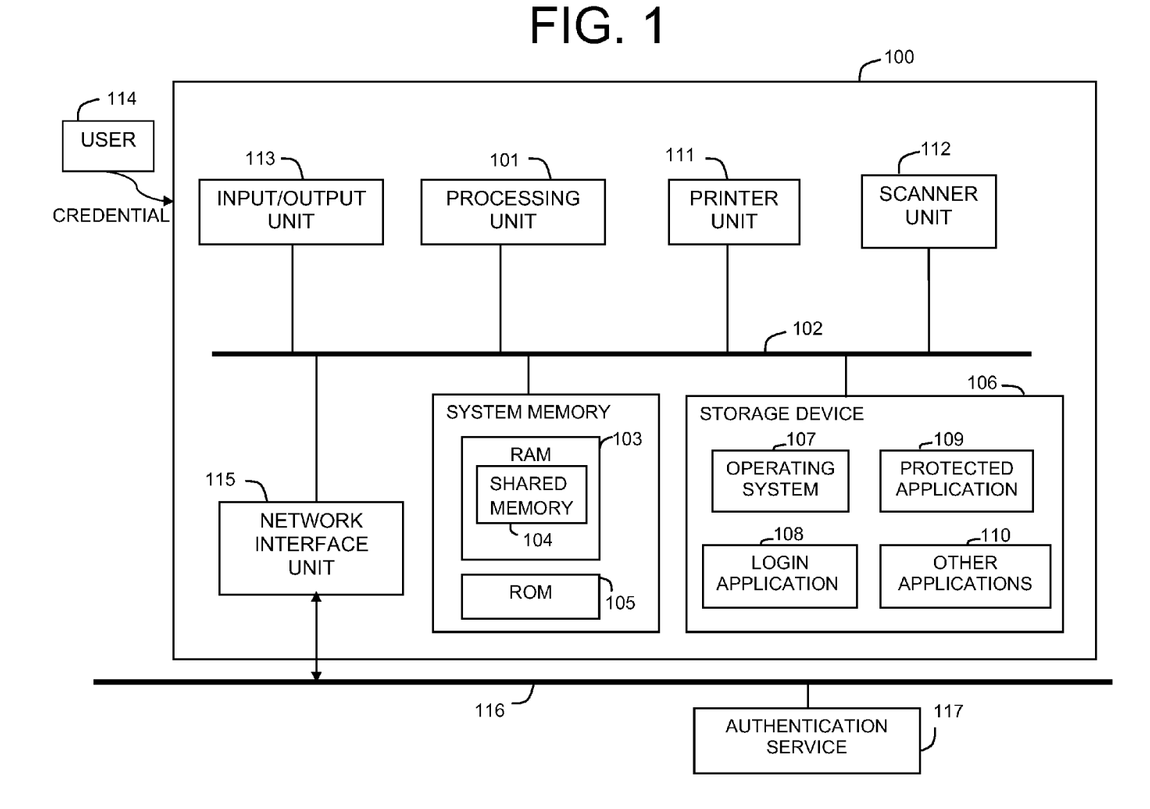
FIG. 1 illustrates an example of a computing architecture in which embodiments of the invention may be implemented.

FIG. 1 illustrates an example of a computing architecture in which embodiments of the invention are implemented. FIG. 1 depicts an image processing device 100 that includes a processing unit 101, system bus 102, system memory including random access memory (RAM) 103 and read only memory (ROM) 105, a storage device 106 storing various programs and data, a printer unit 111, a scanner unit 112, an input/ output (I/O) unit 113, and a network interface unit 115 operable to connect the image processing device 100 to a network 116. The image processing device 100 is connected to an authentication service 117 via the network 116.

The image processing device 100 is an example of a computing system. The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as a memory and processor) work together to perform operations on electronic data. Also, the term resource as used herein includes but is not limited to an object that can be processed at a computing system. A resource can be a portion of executable instructions or data.

The processing unit 101 may comprise a single central-processing unit (CPU) or a plurality of processing units. The processing unit 101 executes various processes and controls the image processing device 100 in accordance with various programs stored in memory. The processing unit 101 controls reading data and control signals into or out of memory. The processing unit 101 uses the RAM 103 as a work area and executes programs stored in the ROM 105 and the storage device 106.

The system bus 102 interconnects various components of the image processing device 100 thereby enabling the transmission of data and execution of various processes. The system bus 102 may be a local bus, for example, and may implement any of a variety of bus architectures.

The RAM 103 is used as a work area during execution of various processes, including when various programs stored in the ROM 105 and/or the storage device 106 are executed. The RAM 103 is used as a temporary storage area for various data. In some embodiments, the RAM 103 is used as a cache memory.

The RAM 103 includes a shared memory 104 from which applications running on the image processing device 100 obtain information as needed. For example, a credential used to log in to the image processing device 100 may be stored in the shared memory 104. Subsequently, an application may obtain the credential from the shared memory 104 and use the credential to log in the user to the application. Further by way of example, domain information associated with a user's login session may be stored in the shared memory 104.

The ROM 105 stores data and programs having computer-executable instructions for execution by the processing unit 101. The ROM 105 stores programs configured to cause the image processing device 100 to execute various operations and processes.

The storage device 106 stores application data, program modules and other information. Some programs and/or program modules stored in the storage device 106 are configured to cause various operations and processes described herein to be executed. The storage device 106 stores an operating system 107, a login application 108, a protected application 109, and other applications 110. The storage device 106 may be, for example, a hard disk or other computer-readable storage medium.

Additionally, the computing system may include other storage media, such as non-volatile flash memory, removable memory, such as a compact disk (CD), digital versatile disk (DVD), a CD-ROM, memory card, magneto-optical disk or any combination thereof. All or a portion of a computer-readable storage medium of the computing system may be in the form of one or more removable blocks, modules, or chips. The computer-readable storage medium need not be one physical memory device, but can include one or more separate memory devices.

The operating system 107 includes programs and data for managing hardware and software components of the image processing device 100. Applications on the image processing device 100 utilize the operating system 107 in executing various operations.

The login application 108 includes programs and data for controlling access to resources of the image processing device 100. According to various embodiments, the login application 108 is configured to authenticate users, control access to resources based on authorization, and/or track users' usage of the image processing device 100.

In some embodiments, the login application 108 uses outside computing systems to perform tasks. For example, the image processing device 100 may be in a network domain that utilizes the authentication service 117 to authenticate users trying to access resources in the network domain. In such a case, the login application 108 may send an authentication request to the authentication service 117 for authenticating the user. The image processing device 100 may be configured for multiple network domains. Accordingly, the login application 108 may utilize multiple authentication services to authenticate users in the respective network domains.

In some embodiments, the login application 108 is configured to execute authentication operations locally. For example, the login application 108 may compare a user credential to a locally stored access control list and then grant or deny the access request based on the comparison.

The login application 108 provides single sign-on capability. For example, when a user 114 logs in to the image processing device 100 upon being authenticated, the login application 108 sends notification of the log-in event to all applications and/or systems configured to receive the notifications. A listing of applications and/or systems configured to receive the log-in event notifications may be stored at the login application 108 and/or the authentication service 117. In some embodiments, applications and/or systems who receive the log-in event notifications initiate operations to log in the user 114 to their respective applications and/or systems. For example, as described above, an application may obtain a credential from the shared memory 104 and use the credential to log in the user 114 to the application. Accordingly, single sign-on is effectuated since the user 114 is logged in both to the image processing device 100 and the respective applications who received the log-in event notifications, even though the user 114 only provided the credential once in order to log in to the image processing device 100.

While the login application 108 generally protects usage of the entire image processing device 100 by controlling access to its resources, some applications on the image processing device 100 may be independently protected by authentication mechanisms. The protected application 109 is one such application.

The protected application 109 includes programs and data configured to execute task-specific functionality and to control access to resources of the protected application 109. Before granting the user 114 access to its resources, the protected application 109 authenticates the user 114 regardless of whether other applications also authenticate the user 114. According to some embodiments, the user 114 is logged in to the protected application 109 by a single sign-on process such as described above, or other single sign-on implementation.

For example, the protected application 109 may be configured to receive a log-in event notification. Accordingly, when the user 114 logs in to the image processing device 100, the login application 108 sends to the protected application 109 a log-in event notification associated with the user's login session on the image processing device 100. Additionally, the login application 108 stores in the shared memory 104 the validated credential used to log in the user 114 to the image processing device 100. The protected application 109 then obtains the user's 114 credential from the shared memory 104 and uses the credential to log in the user 114 to the protected application 109. Accordingly, single sign-on is effectuated since the user 114 is logged in both to the image processing device 100 and the protected application 109, even though the user 114 only provided the credential once in order to log in to the image processing device 100.

Once logged in to the protected application 109, the user 114 gains access to one or more resources of the protected application 109, including the task-specific functionality of the protected application 109. The task-specific functionality of the protected application 109 enables the user 114 to perform one or more tasks using the protected application 109. For example, the protected application 109 may provide various functions, features and user interfaces for processing image data, transmitting data over a network, managing one or more databases, or other tasks. In some embodiments, the protected application 109 is configured to use one or more resources of the image processing device 100 to perform an operation in response to an instruction from the user. For example, the protected application 109 may use functionality of and/or information on the image processing device 100 to carry out an operation.

In some embodiments, the protected application 109 is stored at least in part on one or more computing systems that are remote to the image processing device 100. For example, the protected application 109 may be an application on a remote server. In some embodiments, the protected application 109 and the image processing device 100 are in the same network domain. In some embodiments, the protected application 109 and the image processing device 100 share an authentication authority. In some embodiments, the protected application 109 utilizes the authentication service 117 to authenticate users.

Still referring to FIG. 1, other applications 110 may also be stored in the storage device 106. The other applications 110 include programs and data configured to execute various task-specific functions. For example, one or more of the other applications 110 may relate to printing or scanning functionality. One or more of the other applications 110 may include features that function in connection with the protected application 109. One or more of the other applications 110 may be independently protected by authentication mechanisms, as with the protected application 109.

The printer unit 111 includes a device for printing on a sheet an image corresponding to image data. The scanner unit 112 includes a device for converting image information on a paper document into electric signal data using an optical scanner device. In some embodiments, functionality of the printer unit 111 and/or the scanner unit 112 is implemented when various applications stored in the storage device 106 are executed.

The I/O unit 113 allows for communication between the user 114 and the image processing device 100. For example, the I/O unit 113 may include a monitor or display for output operations such as presenting information to the user 114. The I/O unit 113 is also configured to receive user inputs into the image processing device 100. In some embodiments, the I/O unit 113 includes integrated features such as a touch screen or a panel with buttons to receive user inputs. In some embodiments, the I/O unit 113 includes a variety of interfaces for connecting input devices, such as a keyboard, pointing device, or the like. The I/O unit 113 may also include other features or interfaces for receiving inputs such as a smart card reader, radio-frequency identification (RFID) reader, near field communication (NFC) interface, device for detecting biometric information, wireless receiver, or the like.

The user 114 may utilize the I/O unit 113 in a variety of ways. For example, the user 114 may input via the I/O unit 113 commands such as a command to print, scan, and/or send image data. Further by way of example, the user 114 may provide a credential via the I/O unit 113 in order to log in to the image processing device 100. In some embodiments, the user 114 may provide a username and password for authentication by pressing buttons on a panel of the image processing device 100, or by touching objects displayed on a touch screen of the image processing device 100. In some embodiments, the user 114 may, for authentication, present a smart card storing a certificate and associated key to a smart card reader of the image processing device 100, as well as input a PIN associated with the smart card by pressing buttons on the panel or by touching objects displayed on the touch screen.

The network interface unit 115 is operable to connect the image processing device 100 to one or more networks. As illustrated in FIG. 1, the network interface unit 115 connects the image processing device 100 to the network 116. The network 116 facilitates communications between the image processing device 100 and the authentication service 117. The network 116 is any type of computer network consistent with the teachings of the present invention. For example, the network 116 may comprise a local area network (LAN), wide area network (WAN), or a combination of networks.

The authentication service 117 is one or more computing systems configured to authenticate the user of a client computing system or application. For example, before a user of a client computing system or application is granted access to a protected resource of the computing system or application, the user may be required to provide a credential, such as a username and password. The client computing system or application and the authentication service 117 then communicate and execute various processes according to an authentication protocol such as Kerberos, Windows NT LAN Manager (NTLM), Lightweight Directory Access Protocol (LDAP) or other authentication protocol, in order to determine whether the credential is valid. Once the credential is validated, the user is granted access to the resource. In some embodiments, in addition to verifying the user's identity, the authentication service 117 further determines whether the user has permission or authorization to access one or more of the resources sought.

The authentication service 117 may provide authentication services for multiple computing systems and/or applications. Also, the authentication service 117 may be associated with a particular network domain, performing authentication services for computing systems and/or applications within that network domain. According to some embodiments, the authentication service 117 provides authentication services for the protected application 109 on the image processing device 100. The authentication service 117 may also provide authentication services for one or more other applications on the image processing device 100.

Figure 2:
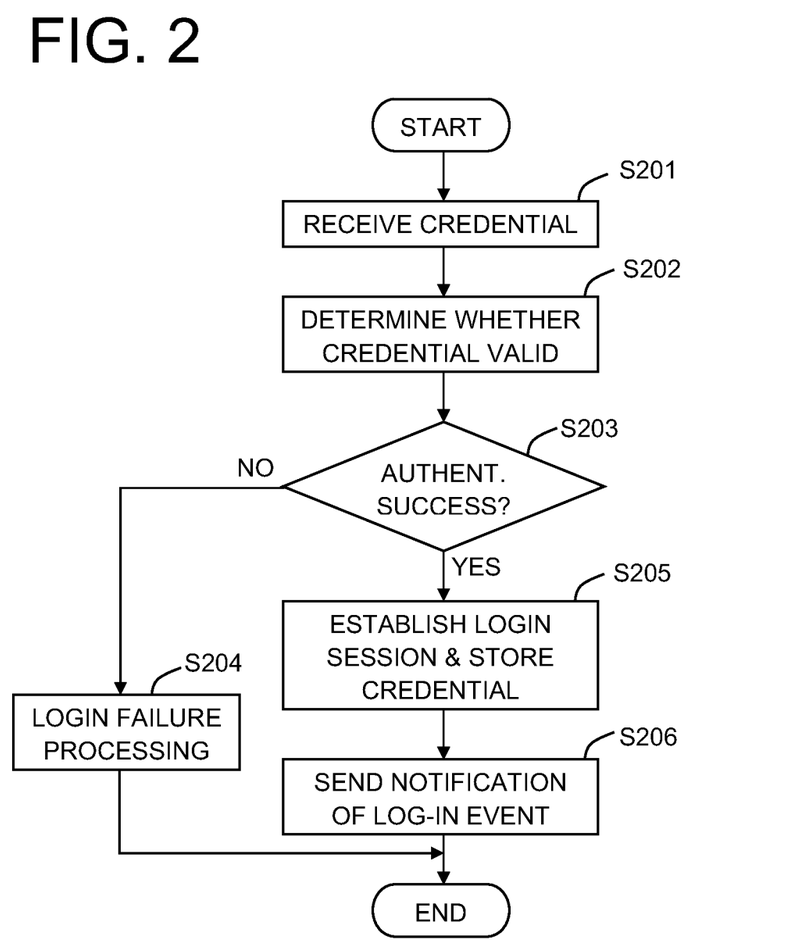
FIG. 2 illustrates a flow of operations for establishing a login session and sending notification regarding the login session according to embodiments of the present invention.

Turning now to FIG. 2, FIG. 2 illustrates a flow of operations for establishing a login session on the image processing device 100 and sending notification regarding the login session according to embodiments of the present invention.

In step S201, the login application 108 of the image processing device 100 receives a credential of the user 114. The user 114 may provide a credential via the I/O unit 113 in order to log in to the image processing device 100. For example, the user 114 may provide one or a combination of a username, password, a smart card, a PIN, biometric information, certificate, or other information to authenticate the identity of the user 114. The I/O unit 113 then sends the credential to the login application 108.

In step S202, the login application 108 determines whether the credential is valid. In some embodiments, step S202 includes using the authentication service 117 to determine whether the credential is valid. For example, the login application 108 and the authentication service 117 may communicate and execute various processes according to an authentication protocol such as Kerberos, NTLM, LDAP or other authentication protocol, in order to determine whether the credential is valid.

In some embodiments, step S202 includes the login application 108 determining whether the credential is valid by comparing the credential to user information on an access control list stored locally. Based on the comparison, the login application 108 may determine, for example, the credential is valid in a case the credential matches some user information on the access control list, or the credential is invalid in a case the credential does not match some user information on the access control list.

In addition to validating the credential, the login application 108 and/or the authentication service 117 may also determine the user's 114 scope of access to resources of the image processing device 100. For example, scope of access may be determined with reference to a set of privileges associated with the user's 114 account that defines the user's 114 authority to access one or more of the resources sought.

In a case the login application 108 determines the credential is invalid, the authentication fails (no in step S203) and the process continues to step S204. In step S204, the login application 108 performs processing in response to the login failure. For example, the login application 108 may prepare and cause to be displayed information indicating to the user 114 that authentication has failed or that the user 114 is denied access to one or more resources of the image processing device 100. The displayed information may include a request that the user 114 provide a credential again or provide a different type of credential, for example.

In response to the login application 108 determining the credential is valid, the authentication succeeds (yes in step S203) and the process continues to step S205. In step S205, the login application 108 establishes a login session and stores the valid credential.

Regarding establishing the login session, the login application 108 establishes the login session by granting the user 114 access to one or more resources of the image processing device 100. That is, the user 114 is logged in to the image processing device 100 by virtue of the credential the user 114 provided. The login session continues until the user 114 is logged out of the image processing device 100. The user 114 is authorized to access the one or more resources of the image processing device 100 over the duration of the user's login session on the image processing device 100. When the user 114 is logged out of the image processing device 100, the user 114 does not have access to the one or more resources of the image processing device 100.

Regarding storing the valid credential, in some embodiments, the login application 108 stores the credential in the RAM 103. In some embodiments, the login application 108 stores the credential in the shared memory 104 of the RAM 103. In addition to the login application 108, one or more other applications, such as the protected application 109, have access to the shared memory 104.

In addition to storing the credential, the login application 108 may also store other information related to the login session. For example, the login application 108 also stores in the shared memory 104 domain information associated with the user's login session on the image processing device 100. The domain information includes information, such as a domain name, that identifies a network domain. Various other information (such as identifiers, access restrictions, privileges) related to the user's login session may also be stored.

In step S206, in response to the user 114 logging in to the image processing device 100 in step S205, the login application 108 sends notification of a log-in event to applications and/or systems configured to receive the notifications. For example, when the user 114 logs in to the image processing device 100, the login application 108 may refer to a listing of applications and/or systems configured to receive the log-in event notifications and then send the log-in event notifications to each in the listing. The listing of applications and/or systems configured to receive the log-in event notifications may be stored at the login application 108 and/or the authentication service 117. A system administrator may access and make updates to the listing. In some embodiments, one or more of the applications and/or systems included in the listing are remote to the image processing device 100. In some embodiments, the login application 108 sends a log-in event notification to the protected application 109.

Figure 3A:
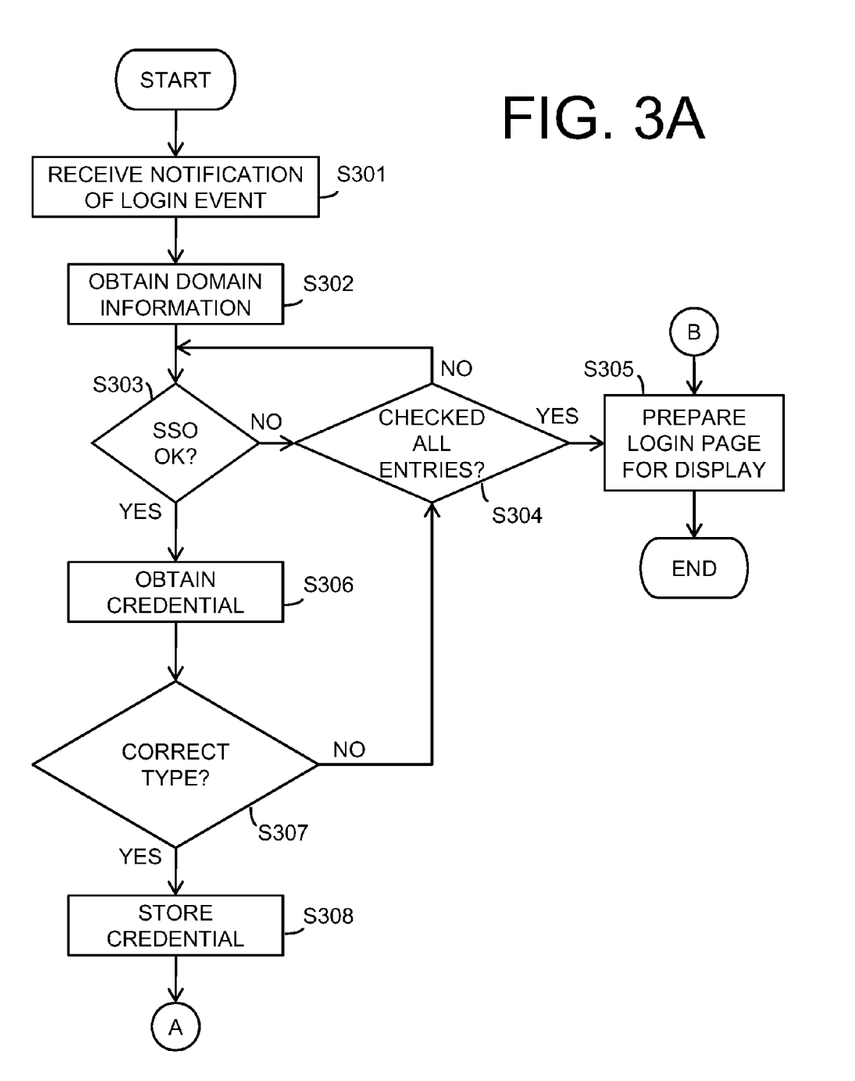
FIGS. 3A-3C illustrate a flow of operations for establishing a login session according to embodiments of the present invention.
Figure 3B:
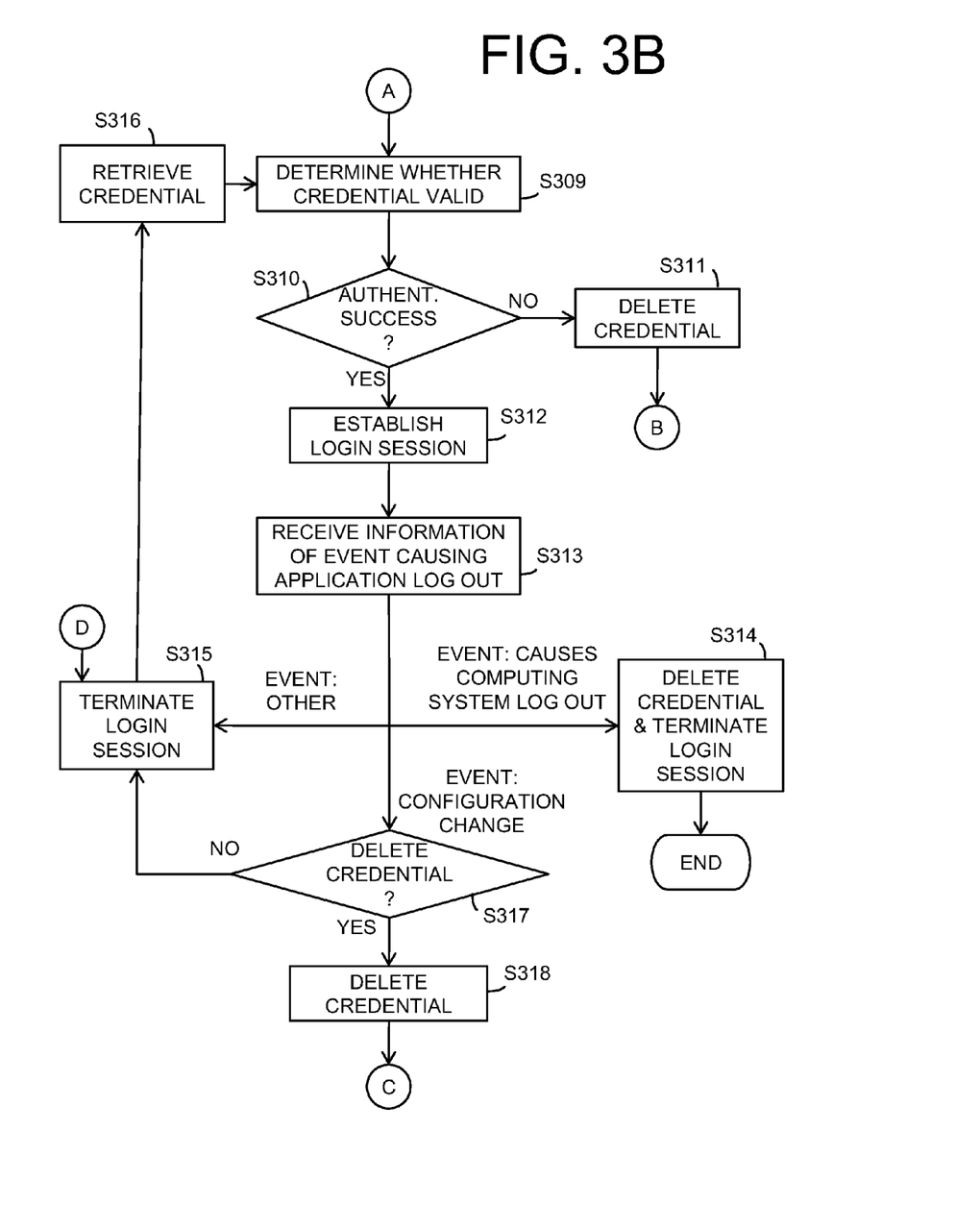
Figure 3C:
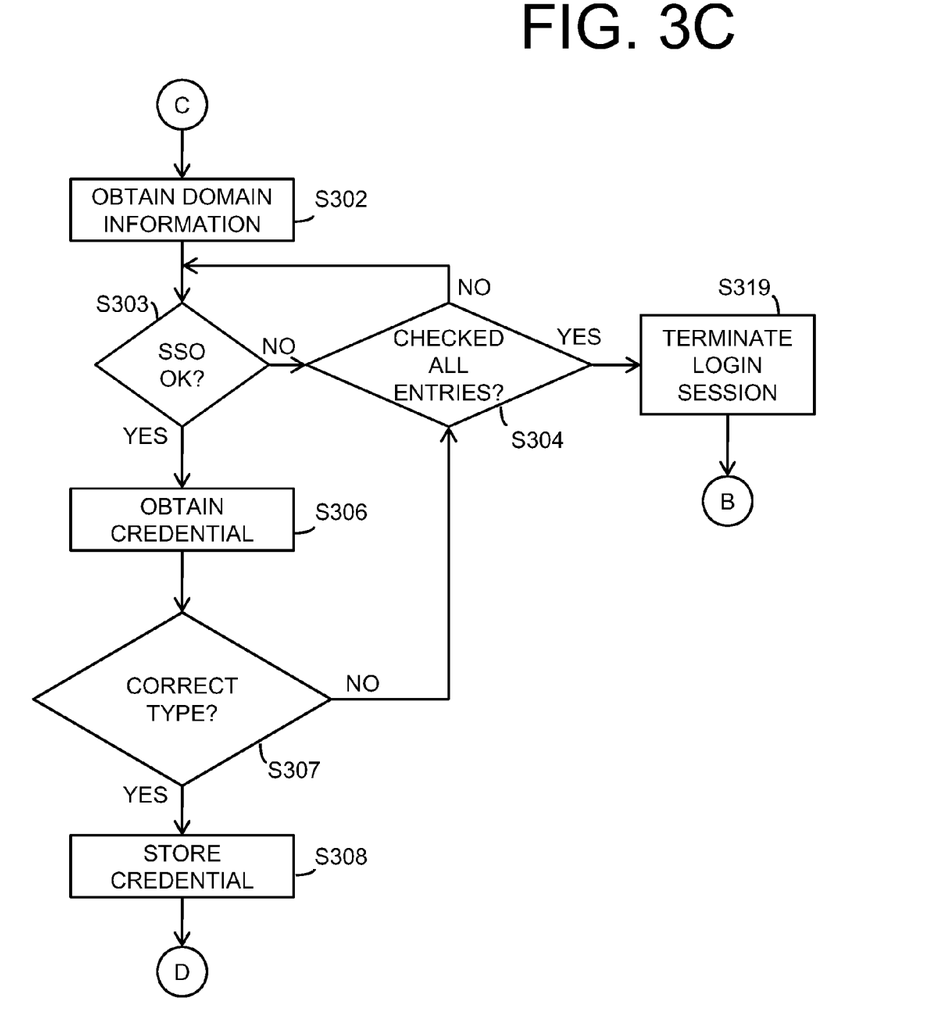

Turning now to FIGS. 3A-3C, FIGS. 3A-3C illustrate a flow of operations for establishing a login session on the protected application 109 according to embodiments of the present invention.

In step S301, the protected application 109 receives the log-in event notification sent in step S206. That is, the protected application 109 receives notification of the log-in event associated with the user's 114 login session on the image processing device 100.

In step S302, the protected application 109 obtains the domain information stored in step S205. In some embodiments, the protected application 109 fetches the domain information from the shared memory 104 in response to receiving the log-in event notification. The domain information identifies the network domain associated with the user's login session on the image processing device 100.

In step S303, the protected application 109 uses the domain information to determine whether the protected application 109 is able to execute a single sign-on operation to log in the user 114 to the protected application 109. To determine whether the protected application 109 is able to proceed with a single sign-on operation, the protected application 109 checks whether it is configured to execute a single sign-on operation for the network domain associated with the user's 114 login session. In some embodiments, for each network domain for which the protected application 109 is configured, the protected application 109 checks its configuration to determine whether single sign-on functionality is turned on or off, and, additionally, whether the network domain matches the network domain associated with the user's login session.

In some embodiments, the protected application 109 checks its configuration to determine whether single sign-on functionality is turned on or off, and/or to determine whether the network domain matches the network domain associated with the user's login session by checking a configuration remotely at one or more authentication servers. In some embodiments, the protected application 109 checks its configuration to determine whether single sign-on functionality is turned on or off, and/or to determine whether the network domain matches the network domain associated with the user's login session by receiving at the protected application 109 a list of information for use in checking a configuration locally. A system administrator may access and make updates to a configuration of the protected application 109.

Regarding the single sign-on functionality mode, in some embodiments, the protected application 109 determines whether single sign-on functionality is turned on or off by checking the status of an indicator, such as a data field, checkbox, switch, button, or the like, which indicates whether the network domain is configured for single sign-on processes (on mode) or not configured for single sign-on processes (off mode).

Regarding determining whether a network domain for which the protected application 109 is configured matches the network domain associated with the user's login session, in some embodiments, the protected application 109 compares at least a portion of the domain information obtained in step S302 with information that indicates the network domain for which the protected application 109 is configured. For example, the protected application 109 may compare the domain name of the network domain associated with the user's login session with the domain name of the network domain for which the protected application 109 is configured.

In a case that the protected application 109 determines in step S303 either that the single sign-on functionality is off or that the network domains do not match (no in step S303), the process continues to step S304.

In step S304, the protected application 109 determines whether all configuration entries have been checked. A configuration entry includes configuration settings for authenticating a user in a network domain. Thus, for example, there is at least one configuration entry for each network domain for which the protected application 109 is configured. There may be multiple configuration entries for a single network domain: for example, one configuration entry for one type of credential (e.g., username and password) and another configuration entry for a different type of credential (e.g., PIN for smart card authentication).

In a case the protected application 109 determines that at least one configuration entry has not been checked (no in step S304), the process continues to step S303. In such a case, the protected application 109 repeats the operations of step S303 described above, except that the operations are performed with respect to a configuration entry that has not been checked. In a case the protected application 109 determines that all configuration entries have been checked (yes in step S304), the process continues to step S305.

In Step S305, the protected application 109 prepares a login page for display. The login page may include information corresponding to the appropriate credential necessary for login, or other information to aid the user 114. For example, the login page may include fields for receiving data. In some embodiments, the login page is prepared but not displayed via the I/O unit 113 until the user 114 seeks to access the protected application 109. Since the processing necessary to prepare the login page is completed prior to the user's accessing the protected application 109, the page can quickly be presented when the user 114 seeks to access the protected application 109. After step S305, the process ends.

In a case that the protected application 109 determines in step S303 that the single sign-on functionality is on and that the network domains match (yes in step S303), the process continues to step S306.

In step S306, the protected application 109 obtains the credential stored in step S205. In some embodiments, the protected application 109 fetches the credential from the shared memory 104 in response to determining the protected application 109 is configured for the network domain associated with the user's login session on the image processing device 100.

In step S307, the protected application 109 compares the type of the credential in the configuration entry to the type of the credential obtained in step S306, where the configuration entry is the configuration entry for which the protected application 109 determined in step S303 that the single sign-on functionality is on and that the network domains match. In a case the protected application 109 determines that the credentials are not the same type (no in step S307), the process continues to step S304, described above. In a case the protected application 109 determines that the credentials are the same type (yes in step S307), the process continues to step S308.

Figure 4:
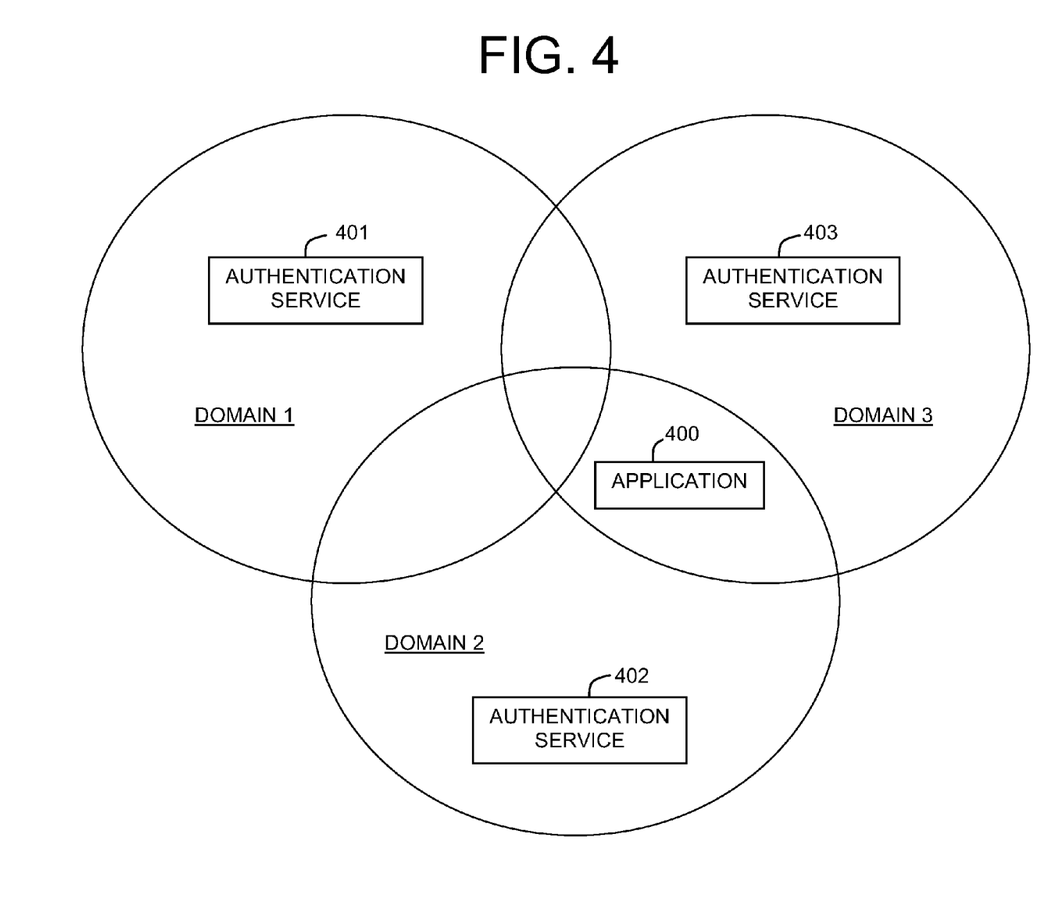
FIG. 4 illustrates an example of a computing environment in which embodiments of the invention may be implemented.

The various operations in steps S303 to S307 are further illustrated with reference to FIG. 4. FIG. 4 illustrates an example of a computing environment in which embodiments of the invention may be implemented. In FIG. 4, an authentication service 401 performs user authentication for domain 1, an authentication service 402 performs user authentication for domain 2, and an authentication service 403 performs user authentication for domain 3. An application 400 is configured with particular configuration settings. The application 400 has not been configured for domain 1, but the application 400 is configured for domain 2 and domain 3. The configuration settings of the application 400 include three configuration entries having the following characteristics:

(1) for domain 2, single sign-on functionality is turned off, and credential type is username and password;

(2) for domain 3, single sign-on functionality is turned on, and credential type is PIN for smart card authentication; and (3) for domain 3, single sign-on functionality is turned on, and credential type is username and password.

For illustration, various operations in steps S303 to S307 are applied to the example computing environment of FIG. 4 in three scenarios.

In a first scenario, the application 400 obtains in step S302 domain information that identifies domain 1. The application 400 then checks the configuration entries (S303 and S304). For the first configuration entry, single sign-on functionality is turned off and the domain (i.e., domain 2) does not match domain 1. For the second and third configuration entries, although single sign-on functionality is turned on, the domain (i.e., domain 3) does not match domain 1. Accordingly, since all configuration entries have been checked, the application 400 prepares a login page for display (S305).

In a second scenario, the application 400 obtains in step S302 domain information that identifies domain 2. The application 400 then checks the configuration entries (S303 and S304). For the first configuration entry, although the domain (i.e., domain 2) matches, single sign-on functionality is turned off. For the second and third configuration entries, although single sign-on functionality is turned on, the domain (i.e., domain 3) does not match domain 2. Accordingly, since all configuration entries have been checked, the application 400 prepares a login page for display (S305).

In a third scenario, a type of the credential stored in step S205 is username and password, and the application 400 obtains in step S302 domain information that identifies domain 3. The application 400 then checks the first configuration entry (S303). For the first configuration entry, single sign-on functionality is turned off and the domain (i.e., domain 2) does not match domain 3 (no in step S303). Accordingly, the application 400 checks whether all configuration entries have been checked (S304). Since the second and third configuration entries have not been checked (no in step S304), the application 400 then checks the second configuration entry (S303).

For the second configuration entry, single sign-on functionality is turned on and the domain (i.e., domain 3) matches (yes in step S303). Accordingly, the application 400 obtains the credential stored in step S205 (S306). The application 400 then compares the type of the credential in the second configuration entry to the type of the credential obtained in step S306 (S307). The credential type (i.e., PIN for smart card authentication) in the second configuration entry is not the same as the credential type (i.e., username and password) obtained in step S306 (no in step S307). Accordingly, the application 400 checks whether all configuration entries have been checked (S304). Since the third configuration entry has not been checked (no in step S304), the application 400 then checks the third configuration entry (S303).

For the third configuration entry, single sign-on functionality is turned on and the domain (i.e., domain 3) matches (yes in step S303). Accordingly, the application 400 obtains the credential stored in step S205 (S306). The application 400 then compares the type of the credential in the third configuration entry to the type of the credential obtained in step S306 (S307). The credential type (i.e., username and password) in the third configuration entry is the same as the credential type (i.e., username and password) obtained in step S306 (yes in step S307). Accordingly, in the third scenario, the application 400 of FIG. 4 advances to step S308.

While FIG. 4 provides specific examples and configurations of various components, these examples, as with all embodiments described herein, are to be considered in all respects only as illustrative of the present invention and not restrictive.

Still referring to FIG. 3A, in step S308, the protected application 109 stores the credential in a memory. For example, the protected application 109 may store the credential in the RAM 103. In some embodiments, the credential is stored in a cache memory. In some embodiments, the area of memory in which the credential is stored is inaccessible to other applications and/or computing systems. In some embodiments, the credential is stored in an encrypted format.

Referring to FIG. 3B, the process continues to step S309. In step S309, the protected application 109 determines whether the credential is valid. In some embodiments, step S309 includes using the authentication service 117 to determine whether the credential is valid. For example, the protected application 109 and the authentication service 117 may communicate and execute various processes according to an authentication protocol such as Kerberos, NTLM, LDAP or other authentication protocol, in order to determine whether the credential is valid.

In some embodiments, step S309 includes the protected application 109 determining whether the credential is valid by comparing the credential to user information on an access control list stored locally. Based on the comparison, the protected application 109 may determine, for example, the credential is valid in a case the credential matches some user information on the access control list, or the credential is invalid in a case the credential does not match some user information on the access control list.

In addition to validating the credential, the protected application 109 and/or the authentication service 117 may also determine the user's 114 scope of access to resources of the protected application 109. For example, scope of access may be determined with reference to a set of privileges associated with the user's 114 account that defines the user's 114 authority to access one or more of the resources sought.

In a case the protected application 109 determines the credential is invalid, the authentication fails (no in step S310) and the process continues to step S311. In step S311, the protected application 109 deletes the credential from memory. For example, in a case the credential is stored in a cache memory, the protected application 109 clears the cache memory. After the credential is deleted, the process continues to step S305, described above, and then the process ends.

In response to the protected application 109 determining the credential is valid, the authentication succeeds (yes in step S310) and the process continues to step S312.

In step S312, the protected application 109 establishes a login session. The protected application 109 establishes the login session by granting the user 114 access to one or more resources of the protected application 109. That is, the user 114 is logged in to the protected application 109 by virtue of the credential the user 114 provided in order to log in to the image processing device 100. In some embodiments, upon establishing the login session, the protected application 109 stores in a memory (e.g., RAM 103) various information related to the user's 114 login session on the protected application 109. The login session continues until the user 114 is logged out of the protected application 109. The user 114 is authorized to access the one or more resources of the protected application 109 over the duration of the user's login session on the protected application 109. When the user 114 is logged out of the protected application 109, the user 114 does not have access to the one or more resources of the protected application 109.

Accordingly, single sign-on is effectuated since the user 114 is logged in both to the image processing device 100 and the protected application 109, even though the user 114 only provided the credential once in order to log in to the image processing device 100. The user's 114 login session on the protected application 109 is established during the user's 114 login session on the image processing device 100. Thus, upon logging in to the protected application 109 in step S312, the user 114 is in a logged-in state with respect to both the image processing device 100 and the protected application 109. From the user's 114 perspective, the user 114 is simultaneously granted access to the image processing device 100 and the protected application 109 upon logging in to the image processing device 100. For example, once logged in to the image processing device 100, the user 114 may access, navigate, and utilize the protected application 109 according to the user's 114 access authority in the same manner the user 114 may access standard features of the image processing device 100. The user 114 remains in this logged-in state with respect to both the image processing device 100 and the protected application 109 until an event causes the user 114 to be logged out of one or both of the image processing device 100 and the protected application 109.

In step S313, the protected application 109 receives information indicating an event has occurred that will cause the user 114 to be logged out of at least the protected application 109. In response to receiving the information indicating the event has occurred, the protected application 109 performs operations based on the event.

In a case the event causes the user 114 to be logged out of the image processing device 100, the process continues to step S314. An example of such an event is the user 114 manually logging out of the image processing device 100 by a user input at the I/O unit 113. For example, the user 114 may touch an object displayed on a touch screen or press a button on a panel to input a logout command. The I/O unit 113 then sends the logout command to the login application 108. The login application 108 sends notification of the log-out event to all applications and/or systems configured to receive the notifications. For example, the login application 108 sends a log-out event notification to the protected application 109 and, in step S313, the protected application 109 receives the log-out event notification.

In step S314, the protected application 109 deletes from memory the credential stored in step S308 and terminates the user's 114 login session on the protected application 109. Regarding deleting the credential, in some embodiments, the protected application 109 deletes the credential from memory by clearing a cache memory. The protected application 109 may also delete other information related to the login session. Regarding terminating the login session, in some embodiments, the protected application 109 terminates the user's 114 login session on the protected application 109 by causing processes belonging to the user's 114 login session on the protected application 109 to be terminated. Once the user 114 is logged out of the protected application 109, the process ends.

Referring again to step S313, in some instances an event causes the user 114 to be logged out of the protected application 109 but does not cause the user 114 to be logged out of the image processing device 100. For example, in response to some events, the protected application 109 may be required and/or configured to reset itself or otherwise end a current login session. However, the same requirement and/or configuration may not exist for the image processing device 100. One example of such an event is a configuration change. In some embodiments, changing a configuration of the protected application 109 causes the user 114 to be logged out of the protected application 109 but does not cause the user 114 to be logged out of the image processing device 100. Other examples of events that may cause the user 114 to be logged out of the protected application 109 but not cause the user 114 to be logged out of the image processing device 100 include the following: navigating away from the protected application 109, particular user inputs (e.g., pressing a device reset button on the image processing device 100), or timing out of the protected application 109 due to inactivity.

Further regarding step S313, the information indicating the event has occurred may vary based on the event. For example, in a case an administrator changes one or more configuration settings of the protected application 109, an automatic notification indicating the change(s) is generated and sent to the protected application 109, according to some embodiments. Further by way of example, in a case a user presses a device reset button on the image processing device 100, the I/O unit 113 sends a signal indicating the event to one or more components of the image processing device 100.

In step S313, in the case that the event is the changing of one or more configuration settings of the protected application 109, the process continues to step S317. For other events that cause the user 114 to be logged out of the protected application 109 but do not cause the user 114 to be logged out of the image processing device 100, the process continues to step S315. In other words, except when the event is a configuration change to the protected application 109, in a case the event of step S313 causes the user 114 to be logged out of the protected application 109 but does not cause the user 114 to be logged out of the image processing device 100, the process continues to step S315.

In step S315, the protected application 109 terminates the user's 114 login session on the protected application 109. In some embodiments, the protected application 109 terminates the user's 114 login session on the protected application 109 by causing processes belonging to the user's 114 login session on the protected application 109 to be terminated. It is noted that, in executing the operations of step S315, the protected application 109 does not delete the credential stored in the memory in step S308. Furthermore, in executing the operations of step S315, the protected application 109 does not affect the user's 114 login session(s) on other applications and/or computing systems. In other words, the protected application 109 resets itself only. Thus, for example, the login session established by the login application 108 in step S205 (i.e., the user's 114 login session on the image processing device 100) is not terminated. Therefore, the user 114 is in a logged-in state with respect to the image processing device 100, but the user 114 is in a logged-out state with respect to the protected application 109.

Upon completing the log-out operations of step S315, the protected application 109 automatically and immediately executes a set of operations for logging the user 114 back in to the protected application 109. For example, following step S315, the process continues to step S316 regardless of whether the protected application 109 has received a request to log the user 114 back in to the protected application.

In step S316, the protected application 109 retrieves the credential stored in the memory in step S308. For example, the protected application 109 may retrieve the credential from the RAM 103. In some embodiments, the credential is retrieved from a cache memory. In some embodiments, the area of memory from which the credential is retrieved is inaccessible to other applications and/or computing systems.

Upon retrieving the credential in step S316, the protected application 109 determines again whether the credential is valid. That is, the process continues to S309 and various operations described above are executed again. A detailed description of the various steps already described above is not repeated herein.

After performing operations to authenticate the user 114, and in response to determining again that the credential is valid, the protected application 109 again establishes a login session by granting the user 114 access to one or more resources of the protected application 109 (step S312). That is, the user 114 is logged back in to the protected application 109. Accordingly, the user 114 is again in a logged-in state with respect to both the image processing device 100 and the protected application 109.

Turning back to step S313, in step S313 the protected application 109 receives information indicating an event has occurred that will cause the user 114 to be logged out of at least the protected application 109. As indicated above, in the case that the event is the changing of one or more configuration settings of the protected application 109, the process continues to step S317.

In step S317, the protected application 109 determines whether to delete the credential stored in the memory in step S308. In some embodiments, to determine whether to delete the credential from the memory, the protected application 109 checks whether there is any change in the configuration settings with respect to an authentication service. For example, the protected application 109 may check whether configuration settings for an authentication server have been deleted, created, and/or modified. Examples of a modification to the configuration settings include a change in the type of credential used for authenticating users, or a change in the single sign-on functionality mode (on or off).

In a case that a configuration setting which relates to an authentication service is changed, the protected application 109 determines to delete the credential (yes in step S317). In such a case, since the configuration change(s) may affect user authentication, the protected application 109 deletes currently stored data and then obtains data for use in authenticating the user 114. On the other hand, in a case that no change was made to any configuration settings which relate to an authentication service, the protected application 109 determines not to delete the credential (no in step S317). In such a case, since the configuration change(s) will not affect user authentication, the protected application 109 can simply use currently stored data for authenticating the user 114.

In the case that the protected application 109 determines not to delete the credential (no in step S317), the process continues to step S315, which is described above. On the other hand, in the case that the protected application 109 determines to delete the credential (yes in step S317), the process continues to step S318.

In step S318, the protected application 109 deletes the credential from memory. For example, in a case the credential is stored in a cache memory, the protected application 109 clears the cache memory. Upon deleting the credential in step S318, the process continues to step S302 of FIG. 3C.

Regarding FIG. 3C, except for step S319, the steps of FIG. 3C are identical to the respective corresponding steps of FIG. 3A. The various corresponding steps are executed again in order to obtain data for use in authenticating the user 114. A detailed description of the various steps already described above is not repeated herein.

Regarding step S319, in a case the protected application 109 determines in step S304 of FIG. 3C that all configuration entries have been checked (yes in step S304), the process continues to step S319. In step S319, the protected application 109 terminates the user's 114 login session on the protected application 109. For example, in some embodiments, the protected application 109 terminates the user's 114 login session on the protected application 109 by causing processes belonging to the user's 114 login session on the protected application 109 to be terminated. Once the user 114 is logged out of the protected application 109, the process continues to step S305, described above.

Further regarding FIG. 3C, once the protected application 109 stores the credential in the memory in step S308, the process continues to step S315, which is described above. After performing operations to authenticate the user 114, and in response to determining again that the credential is valid, the protected application 109 again establishes a login session by granting the user 114 access to one or more resources of the protected application 109 (step S312). That is, the user 114 is logged back in to the protected application 109. Accordingly, the user 114 is again in a logged-in state with respect to both the image processing device 100 and the protected application 109.

According to various embodiments, the protected application 109 associated with the image processing device 100 executes a single sign-on process multiple times in order to establish multiple, asynchronous login sessions during a user's single login session on the image processing device 100. Additionally, in some embodiments, the protected application 109 establishes these multiple, asynchronous login sessions without sending a request to the login application 108 of the image processing device 100 and without prompting the user to provide a credential. For example, the protected application 109 automatically initiates a single sign-on process to log a user back in to the protected application 109 in the event the user is logged out of the protected application 109 but remains logged in to the image processing device 100. Furthermore, in a case the protected application 109 terminates the user's login session on the protected application 109, the termination does not interfere with other login sessions.

The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable storage medium storing instructions which, when executed by one or more processors, causes the one or more processors to perform one or more embodiments of the invention described herein.

Examples of a computer-readable storage medium include a floppy disk, a hard disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A method comprising:
receiving, at a computing device, notification of a log-in event associated with a first login session wherein a user is logged in to the computing device based on a credential such that the user is authorized to access a resource of the computing device;
obtaining the credential from a first storage area;
storing the credential in a second storage area, the second storage area different from the first storage area;
determining whether the credential is valid;
during the first login session and in response to determining that the credential is valid, establishing, at the computing device, a second login session wherein the user is logged in to an application on the computing device by granting the user access to a resource of the application;
receiving, at the computing device, information indicating an event has occurred;
during the first login session and in response to the receiving the information indicating the event has occurred, terminating the second login session such that the user does not have access to the resource of the application;
in response to the terminating the second login session, retrieving the credential from the second storage area;
in response to the retrieving the credential from the second storage area, determining again whether the credential is valid; and
during the first login session and in response to determining again that the credential is valid, establishing, at the computing device, a third login session wherein the user is logged in to the application on the computing device by granting the user access to a resource of the application.

2. The method of claim 1, further comprising:
in response to the receiving the information indicating the event has occurred, determining whether to delete the credential from the second storage area,
wherein the event comprises changing a configuration of the application.

3. The method of claim 2, wherein the determining whether to delete the credential from the second storage area is based on whether the changing the configuration of the application includes a configuration change with respect to an authentication service.

4. The method of claim 2, further comprising:
in response to determining to delete the credential from the second storage area, deleting the credential from the second storage area;
in response to the deleting the credential from the second storage area, obtaining again the credential from the first storage area; and
in response to the obtaining again the credential from the first storage area, storing again the credential in the second storage area,
wherein the retrieving the credential from the second storage area comprises retrieving the credential stored again in the second storage area.

5. The method of claim 1, wherein a transition from the second login session to the third login session occurs without prompting the user to provide a credential.

6. The method of claim 1, further comprising:
obtaining domain information associated with the first login session, the domain information identifying a network domain; and
determining whether the application is configured for the network domain.

7. The method of claim 1, wherein the determining again whether the credential is valid comprises using a remote authentication service to determine whether the credential is valid.

8. The method of claim 1, wherein the obtaining the credential from the first storage area comprises obtaining the credential from a memory shared by the application and one or more other applications on the computing device.

9. The method of claim 1, wherein the computing device comprises an image processing device and wherein the application is configured to use a resource of the image processing device to perform an operation in response to an instruction from the user.

10. An apparatus comprising:
one or more processors; and
one or more computer-readable media coupled to the one or more processors, the one or more computer-readable media storing instructions that, when executed by the one or more processors, cause the one or more processors to perform operations comprising:
receiving, at a computing device, notification of a log-in event associated with a first login session wherein a user is logged in to the computing device based on a credential such that the user is authorized to access a resource of the computing device;
obtaining the credential from a first storage area;
storing the credential in a second storage area, the second storage area different from the first storage area;
determining whether the credential is valid;
during the first login session and in response to determining that the credential is valid, establishing, at the computing device, a second login session wherein the user is logged in to an application on the computing device by granting the user access to a resource of the application;
receiving, at the computing device, information indicating an event has occurred;
during the first login session and in response to the receiving the information indicating the event has occurred, terminating the second login session such that the user does not have access to the resource of the application;
in response to the terminating the second login session, retrieving the credential from the second storage area;
in response to the retrieving the credential from the second storage area, determining again whether the credential is valid; and
during the first login session and in response to determining again that the credential is valid, establishing, at the computing device, a third login session wherein the user is logged in to the application on the computing device by granting the user access to a resource of the application.

11. A non-transitory computer-readable storage medium storing instructions that, when executed by one or more processors, cause the one or more processors to perform operations comprising:
receiving, at a computing device, notification of a log-in event associated with a first login session wherein a user is logged in to the computing device based on a credential such that the user is authorized to access a resource of the computing device;
obtaining the credential from a first storage area;
storing the credential in a second storage area, the second storage area different from the first storage area;
determining whether the credential is valid;
during the first login session and in response to determining that the credential is valid, establishing, at the computing device, a second login session wherein the user is logged in to an application on the computing device by granting the user access to a resource of the application;
receiving, at the computing device, information indicating an event has occurred;
during the first login session and in response to the receiving the information indicating the event has occurred, terminating the second login session such that the user does not have access to the resource of the application;
in response to the terminating the second login session, retrieving the credential from the second storage area;
in response to the retrieving the credential from the second storage area, determining again whether the credential is valid; and
during the first login session and in response to determining again that the credential is valid, establishing, at the computing device, a third login session wherein the user is logged in to the application on the computing device by granting the user access to a resource of the application.

12. The non-transitory computer-readable storage medium of claim 11, the operations further comprising:
in response to the receiving the information indicating the event has occurred, determining whether to delete the credential from the second storage area,
wherein the event comprises changing a configuration of the application.

13. The non-transitory computer-readable storage medium of claim 12, wherein the determining whether to delete the credential from the second storage area is based on whether the changing the configuration of the application includes a configuration change with respect to an authentication service.

14. The non-transitory computer-readable storage medium of claim 12, the operations further comprising:
  in response to determining to delete the credential from the second storage area, deleting the credential from the second storage area;
  in response to the deleting the credential from the second storage area, obtaining again the credential from the first storage area; and
  in response to the obtaining again the credential from the first storage area, storing again the credential in the second storage area,
  wherein the retrieving the credential from the second storage area comprises retrieving the credential stored again in the second storage area.

15. The non-transitory computer-readable storage medium of claim 11, wherein a transition from the second login session to the third login session occurs without prompting the user to provide a credential.

16. The non-transitory computer-readable storage medium of claim 11, the operations further comprising:
  obtaining domain information associated with the first login session, the domain information identifying a network domain; and
  determining whether the application is configured for the network domain.

17. The non-transitory computer-readable storage medium of claim 11, wherein the determining again whether the credential is valid comprises using a remote authentication service to determine whether the credential is valid.

18. The non-transitory computer-readable storage medium of claim 11, wherein the obtaining the credential from the first storage area comprises obtaining the credential from a memory shared by the application and one or more other applications on the computing device.

19. The non-transitory computer-readable storage medium of claim 11, wherein the computing device comprises an image processing device and wherein the application is configured to use a resource of the image processing device to perform an operation in response to an instruction from the user.

* * * * *